(No Model.)

W. WILSON.
Apparatus for Forming Cement Sewers or Pipes.

No. 233,825.

Patented Oct. 26, 1880.

Witnesses
John Wilson
P. C. Taylor

Inventor
William Wilson
By Robert Vose Jr.
Atty

UNITED STATES PATENT OFFICE.

WILLIAM WILSON, OF OTSEGO, MICHIGAN.

APPARATUS FOR FORMING CEMENT SEWERS OR PIPES.

SPECIFICATION forming part of Letters Patent No. 233,825, dated October 26, 1880.

Application filed August 14, 1880. (No model.)

*To all whom it may concern:*

Be it known that I, WILLIAM WILSON, a citizen of the United States, residing at Otsego, in the county of Allegan and State of Michigan, have invented certain new and useful Improvements in Apparatus for Forming Cement Sewers or Pipes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.
This invention relates to improvements in the art of laying cement or concrete sewers, by which the artisan is enabled to construct the sewer-pipe of any desired dimension or form in the place where it is to remain, thus avoiding the trouble and expense of transporting it in sections, as well as making a continuous pipe without leaks from unclosed joints between the sections, which so frequently occur when a sewer is laid from sections of pipe previously formed and united at the time of laying by any of the various joints now in use; and the invention consists in suitable forming devices, by means of which the artisan is enabled to give the desired form to the sewer as he proceeds with his work, all as will be hereinafter fully described.

Figure 1:
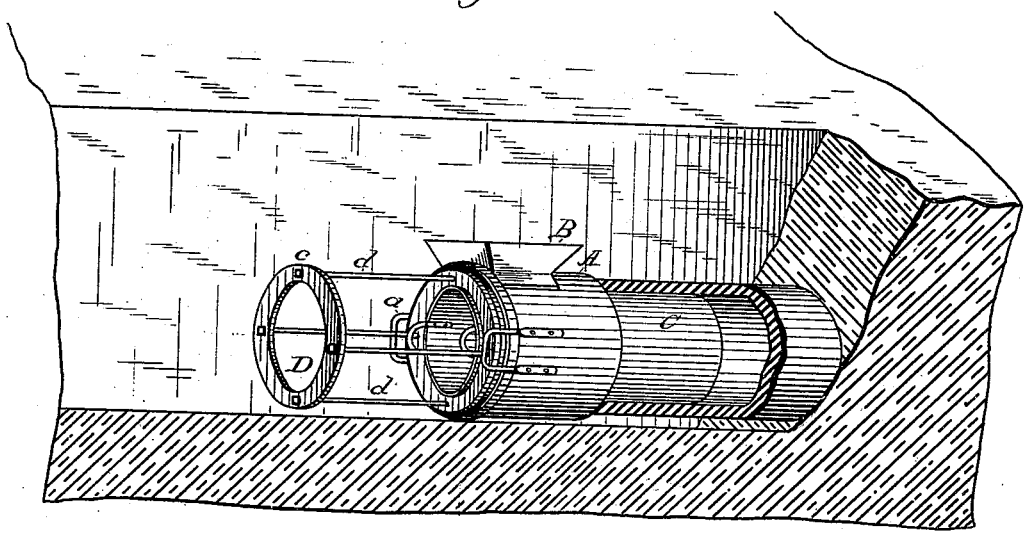
Figure 2:
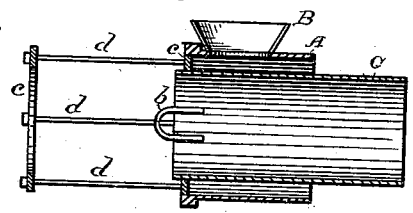
Figure 3:
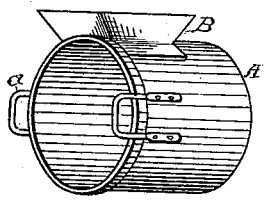
Figure 4:
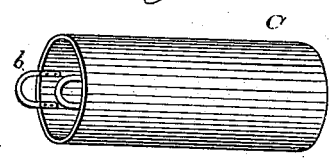
Figure 5:
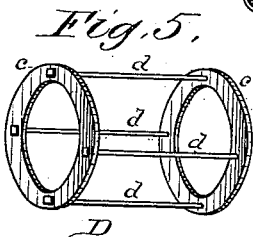

In the accompanying drawings, Figure 1 is a perspective view, showing the apparatus in position for work within a trench. Fig. 2 is a vertical longitudinal section of the apparatus. Fig. 3 is a perspective view of the outside cylinder or former. Fig. 4 is a similar view of the inside or core cylinder. Fig. 5 shows the circle-frame, which acts as a guide, and also prevents the outflow of the cement or concrete from between the cylinders.

Small water-pipes have heretofore been constructed in the trench where they were to remain, the bottom of the trench being rounded and brought to the size of the periphery of the proposed pipe. Then a mold consisting of a section of rubber hose or other suitable elastic material, of the same diameter as the proposed pipe, was used as a core, surrounding which the cement was built, the core being drawn along as the pipe was finished; but it is evident that this method of construction, if employed for sewers or other tubes of greater caliber than the small water or waste pipes used about dwellings, would involve a great loss of material as well as waste of time, it being almost impossible to form the trench so regularly that the pipe or sewer would be of even thickness, or to so build its top as to avoid the same evil. Therefore, in order to overcome these evils, I have constructed the apparatus which will be hereinafter described, by means of which I am enabled to construct a sewer or other pipe of large diameter within the trench where it is to remain, and at the same time preserve its walls of even and any desired thickness throughout its length.

In the drawings, A represents a hollow cylinder, preferably formed of sheet metal, and of the same diametrical shape inside as the outside of the proposed sewer, and of a length not too great to allow of its being readily filled through the hopper B before the preceding section has become so firm and dry as to prevent a perfect union of one part with the other. The hopper B is attached to the said cylinder at the point of its periphery, which is intended to be uppermost during the operation of constructing the sewer, and is preferably formed of sheet metal in the rectangular shape shown in Fig. 2. To the outside of said cylinder, at points diametrically opposite, are also attached the handles *a a*, by means of which the cylinder may be drawn forward when one section of the pipe or sewer is finished, and it is desired to add to its length by forming another adjacent to it.

C represents the core-cylinder, which may also be a sheet-metal cylinder of the same, or nearly the same, diametrical contour as the cylinder A, but of greater length and less diameter, the difference in their diameters giving the desired thickness to the sewer or tube. This core-cylinder C is also provided with handles *b b*, riveted or otherwise secured to its inside at points diametrically opposite each other, by which it may be drawn forward as the construction of the tube progresses.

In order to prevent the cement from falling out from the cavity between the cylinders as it passes down between them from the hopper, a frame, D, is used, composed of the two annular plates *c c*, said plates being of a width equal to the space between the outer and inner cylinders, and united by rods *d d*, (two or more,) which are firmly secured to the plates, the whole forming a stiff frame, which, when one of the annular plates is placed in position between the forming-cylinders, retains them in their proper relative positions and prevents the exit of the cement or other plastic material forming the tube from between them. It also acts as a guide for the forming-cylinders when they are drawn forward.

The mode of forming a sewer or tube with this apparatus may be described as follows: A trench is first dug, of proper size and depth, its bottom approximating in form to that of the proposed sewer. The apparatus is then placed in the trench in the position shown in Fig. 1 of the drawings, the core-cylinder C occupying the position of a section of the internal cavity of the tube, and the cylinder A surrounding its periphery. The frame D being placed in the trench in front of the cylinders, with one of its annular plates between them, the cement, concrete, or other plastic material is then shoveled into the hopper and the vacant space between the cylinders filled. As soon as it has set sufficiently to retain its shape the outer cylinder is drawn forward upon the frame D about one-third of its length and the core-cylinder the same distance within the said frame, after which the frame itself is drawn forward until it occupies the same position with relation to the cylinders that it did in forming the first section of the tube. The vacant space between the cylinders being now filled, as before, a second section is formed, and by a repetition of the process tubes or sewers of any desired length may be formed free from cracks or openings that would allow the escape of deleterious gases or other matter therefrom.

I am aware that an apparatus having an outer forming-shell, provided with a hopper upon its upper side and a contractible core, has been invented for the purpose of forming sewer-pipe in sections, such sections being united by a faucet-joint. This I do not claim; but What I do claim, and desire to secure by Letters Patent, is as follows:

1. In an apparatus for forming cement sewers, the guide-frame D, composed of the annular plates *c c* and connecting-bars *d d*, arranged in the manner described, to form a stop for the cement between the forming and core cylinders and act as a guide for them when drawn forward, substantially as set forth.

2. In an apparatus for forming cement sewers, the combination of an outer forming-cylinder and a core-cylinder, each provided with handles at one end, by which they may be drawn forward, with a guide-frame, D, all the parts being constructed and arranged for joint operation in the manner shown and described.

In testimony whereof I affix my signature in presence of two witnesses.

WILLIAM WILSON.

Witnesses:
N. W. MILLS,
E. D. YECKLEY.